E0152 XR 3,706,040
B5-22-69
Dec. 12, 1972 E. J. GARGINI 3,706,040
WIRED BROADCASTING SYSTEMS WITH PHANTOM CIRCUIT
SUPPLYING CONTROL CURRENT ON PROGRAM
SIGNAL WIRES
Filed May 21, 1970
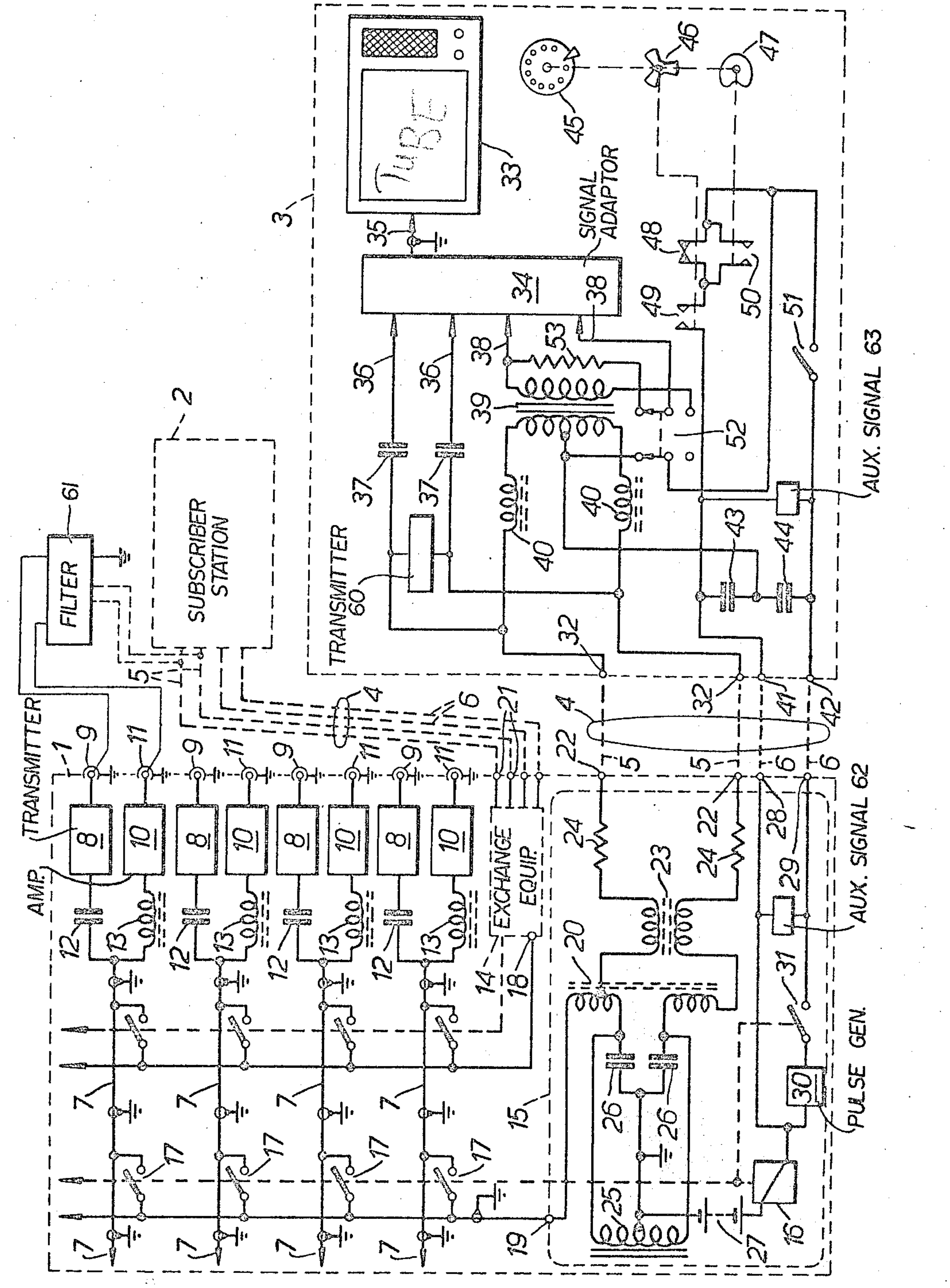
INVENTOR
ERIC J. GARGINI
BY Laurence R. Brown
ATTORNEY United States Patent Office 3,706,040
Patented Dec. 12, 1972

3,706,040
WIRED BROADCASTING SYSTEMS WITH PHANTOM CIRCUIT SUPPLYING CONTROL CURRENT ON PROGRAM SIGNAL WIRES

Eric J. Gargini, West Drayton, England, assignor to Communications Patents Limited Filed May 21, 1970, Ser. No. 39,497
Claims priority, application Great Britain, May 22, 1969, 26,200/69
Int. Cl. H04c *1/04*
U.S. Cl. 325—308 33 Claims

ABSTRACT OF THE DISCLOSURE

A wired television system provides for two balanced conductor pairs connected between subscribers and a central station with a plurality of signal highway routes. One conductor pair passes the television signals and a control voltage which is interrupted by a dial at the subscriber station to scan a stepping switch at the central station and make a selection or to return to a datum position. Auxiliary signals may be passed along the second pair of conductors. Each program exchange includes impedance matching networks and filters to provide balanced signals and to process low frequency audio and high frequency television signals.

This invention relates to wired broadcasting systems and seeks to provide an improved form thereof. Wired broadcasting systems in accordance with the present invention are particularly suitable for the distribution of a large number of programmes to the subscribers of said system.

According to the invention there is provided a wired broadcasting system in which a programme exchange arranged to provide any one of a plurality of different programme signals to each of a plurality of subscribers located remote from said programme exchange includes a plurality of programme selection means each designating a corresponding subscriber, a cable connection between said programme exchange and each of said plurality of subscribers which includes four conductive paths formed by a first pair of conductors allocated to the conveyance of programme signals and supply current for actuating said programme selection means in one direction from said programme exchange to said subscriber and a second pair of conductors allocated to the conveyance of control signals in the opposite direction from said subscriber to said programme exchange, said control signals being arranged to be formed from said supply current by means of a control device actuable by the subscriber for controlling the operation of said programme selection means.

In a preferred form of wired broadcasting system of the type described in the preceding paragraph the first pair of conductors allocated to the conveyance of programme signals and supply current are arranged to function as a balanced transmission line for said programme signals, the supply current being passed over said conductors by means of a phantom circuit connection.

The second pair of conductors allocated to the conveyance of control signals may be arranged one to convey control signals effective to move the programme selection means from a datum position to another position at which signals pertaining to a desired programme are applied to said first pair of conductors and the other to convey control signals to move said programme selection means to said datum position from another position.

If desired the second pair of conductors may be utilised, during such time as they are not in use for the conveyance of control signals, for the conveyance of auxiliary signals which may be of any nature having characteristics which are suitable for transmission over said second pair. These auxiliary signals may be unrelated to those conveyed between the programme exchange and the subscriber over the first pair and may, for example, comprise additional sound-only programmes, telephone signals, control signals for pay-television programmes, telemetering signals for gas, water or electricity or electricity consumption by the subscriber or signals related to the control of surveillance equipment for guarding or controlling access to the subscriber's premises.

The invention also provides a programme exchange for a wired broadcasting system in which any one of a plurality of different programmes are arranged to be available to each of a plurality of subscribers located remote from said exchange inclusion means serving to establish a plurality of signal highways each carrying signals pertaining to a different programme and a plurality of programme selection means each pertaining to a corresponding subscriber and arranged selectively to establish a connection between one of said highways and a pair of programme terminals from which said subscriber may derive selected programme signals in response to control signals applied to one or other of a pair of control signal terminals by the establishment, by means of a control device actuable by said subscriber, of one or more electrical connections between said control terminals and a phantom circuit connection established between said programme terminals.

In a programme exchange arranged to provide television programmes each signal highway may be arranged to carry both the vision and sound signals pertaining to a television programme. Conveniently, the sound signals may be at audio frequency whilst the vision signals may comprise a modulated high frequency carrier wave. However, in some circumstances it may be advantageous to provide the sound signals both at audio frequency and in the form of an additional modulated high frequency carrier wave. In such a case it will no doubt be preferred to arrange that the additional modulated high frequency carrier wave has a frequency which is related to the frequency of the modulated high frequency carrier wave pertaining to the vision signals in the same manner as that required by a receiver of a kind utilised for the aerial reception of television signals so that such receivers can be arranged to utilise the signals available on the wired broadcasting network through the intermediary of a signal adaptor.

In a programme exchange of the kind referred to above, it is preferred that the signal highways are arranged for operation as low impedance unbalanced signal paths and means are associated with the subscriber's programme selection means to transform from said low impedance unbalanced signal paths to a balanced pair of programme signal conductors over which said signals are arranged to be conveyed from the programme exchange to said subscriber.

The invention also provides a programme exchange wherein means are provided for applying a subscriber-originated transmission to a signal highway, preferably a spare signal highway reserved for such use, from which it may be derived both by the originating subscriber and other subscribers connected to said exchange.

The control means preferably comprises a dial mechanism, actuation of which by the subscriber serves to establish one or a series of connections having a predetermined duration between one of said control terminals and said phantom connection. A further control means may be provided which, when actuated by the subscriber, serves to establish a connection between the other of said control terminals and said phantom connection.

If desired interlock means may be provided to prevent the simultaneous reception of sound programme signals and the transmission of control signals by the control means whereby interference to the sound programme signals by the control signals is avoided. Conveniently, the interlock means may comprise a switch device which serves in one condition to open the current path between the control means and the phantom connection and at the same time close the sound signal path between said pair of programme signal terminals and a loudspeaker arranged for reproduction of the sound signals, and in another condition serves to close the current path between said control means and said phantom connection and at the same time opens the sound signal path between said pair of programme signal terminals and said loudspeaker.

In a development of the wired broadcasting system according to the present invention facilities may be provided whereby at least one of the subscriber's installations is enabled to originate a television programme for transmission to the programme exchange at which the subscriber-originated television transmission is passed to a signal highway, preferably a spare signal highway reserved for such use, from which it may be derived both by the originating subscriber and by other subscribers connected to said exchange.

In order that the invention may be more readily understood one particular embodiment thereof will now be described, by way of example only, with reference to the accompanying drawing which is a schematic diagram of a wired broadcasting system including a programme exchange and a subscriber's installation in accordance with the present invention.

In the drawing a programme exchange 1 is arranged to provide any one of a plurality of signals in respect of different television programmes to each of a plurality of subscribers' installations or stations 2, 3 by means of a cable connection. The cable connection includes four conductive paths formed by a first pair of conductors 5, allocated to the conveyance of programme signals and supply current in one direction from said programme exchange 1, to the subscribers 2, 3, and a second pair of conductors 6, allocated to the conveyance of control signals in the opposite direction. At the programme exchange 1 there is provided a plurality of signal highways 7, each carrying, in the example shown, signals pertaining to a different television programme. These television programme signals comprise a modulated high frequency carrier wave provided by a transmitting device 8 which is arranged to receive vision signals at a corresponding vision input terminal 9. The accompanying sound signals are at audio frequency and are provided by audio frequency power amplifiers 10 which are arranged to receive their sound input signals at corresponding sound input terminals 11. Each vision transmitter 8 and its associated sound amplifier 10 are connected to the same signal highway 7 in a mutually exclusive manner, for example, through impedance devices such as the capacitor 12, which is chosen to have a value such as to present a relatively low impedance to the passage of high frequency vision signals but a high impedance to audio frequency signals, and the inductor 13 which is chosen to have a value such as to present a relatively low impedance to audio frequency signals but a high impedance to the high frequency vision signals.

Each subscriber is provided with a corresponding set of subscriber's exchange equipment 14, 15, which comprises a programme selection means formed by an electromechanically-operable switch device which includes a driving solenoid 16 and a plurality of contacts 17 by means of which a connection may be made between a desired one of said signal highways and an input terminal 18, 19 of the subscriber's exchange equipment 14, 15.

A switch of this kind is described and claimed in our copending U.S. application Ser. No. 19,378, filed Mar. 13, 1970.

As will be seen from the drawing the signal highways are arranged for operation as low impedance unbalanced signal paths and the subscriber's exchange equipment 14, 15, includes a combined balancing and impedance matching transformer 20 by means of which the low impedance unbalanced input at the terminals 18, 19 is transformed to a balanced output of high impedance at a corresponding pair of programme terminals 21, 22. Between the transformer 20 and terminals 22 there may be provided a longitudinal current suppression choke 23, the purpose of which is to reduce unbalanced signals which may be applied to the terminals 22, and a pair of impedances in the form of resistors 24, which serve to match the balanced source impedances of the transformer 20 to that of the pair of signal conductors 5.

The audio frequency signals applied to the terminal 19 are also unbalanced with respect to earth and these are transformed to balanced signals for application to the terminals 22 by means of a tapped low-frequency choke 25 the outer terminals of which are connected to the inner terminals of the balanced high frequency winding on the transformer 20. The high frequency by-pass capacitors 26 serve to provide a path for high frequency signals across the choke 25. The tapping on the choke 25 is arranged to establish a phantom connection to the programme signal terminals 22. To this phantom connection there is connected one end of a current supply source indicated by the battery 27. The other terminal of the battery 27 is connected to one terminal of the actuating solenoid 16 of the programme selection means. The other terminal of this solenoid 16 is connected directly to a first terminal 28 of a pair of control terminals and also to a second terminal 29 of said control terminals through a square wave generating device 30 and a homing switch contact 31 which is associated with the solenoid 16 and is arranged to be closed in any position other than a datum position in which none of the switches 17 is closed. Thus, in the datum position no television programmes are applied to the input terminal 19 of the subscriber's exchange equipment 15.

At the subscriber's installation there is arranged a pair of signal input terminals 32 from which may be derived the audio frequency signals and high frequency signals in respect of a television programme. Since these signals are not suitable for direct application to the standard television receiver 33, there is provided a signal adaptor 34 which provides on its output line 35 signals of a type to which the receiver 33 can respond. The signal adaptor 34 requires separate inputs in respect of the high frequency vision signals and the audio frequency sound signals and these are separated by impedance devices similar to those employed at the programme exchange for combining the signals on the signal highways 7. The capacitors 37 thus allow the passage of high frequency signals but impede the audio frequency signals, whilst the high frequency chokes 40 allow the passage of audio frequency signals from the input terminals 32 to the coupling transformer 39 but impede the high frequency vision signals. The primary winding of the transformer 39 which is connnected to the terminals 32 is tapped to provide a phantom connection through which may be derived the supply current provided at the programme exchange by the battery 27. This tapping is connected to the control terminals 41, 42, through corresponding capacitors 43, 44, which are arranged to minimise surges which may be picked up on the cable connection 4 between the subscriber's installation and the programme exchange.

The subscriber's installation also includes a dial mechanism 45 which may be of a kind similar to that employed on automatic telephone instruments. This dial mechanism serves, upon actuation by the subscriber, to establish one or a series of connections of predetermined duration between the tapping on the primary winding of the transformer 39 and the control terminals 41. To this end the dial mechanism includes two cam-members 46, 47, the cam-member 46 being associated with two contact members 48, 49, and the cam-member 47 being associated with contacts 50. The combined effect of the contacts 48, 49, 50, is to establish one connection of predetermined duration between the control terminal 41 and the transformer tap for each digit indicated by the dial mechanism 45. These connections are arranged at the programme exchange to move the programme selection means from its datum position so as to cause actuation of the required switch contact 17 which will cause input signals to appear at the terminal 19 from that signal highway 7 which is carrying the programme which the subscriber desires to receive. A further control means in the form of a push-to-make switch 51 is provided at the subscriber's installation. This switch when actuated serves to establish a connection between the other control terminal 42 and the tapping on the transformer 39. Such actuation of the switch 51 serves to cause the programme selection means at the exchange to return to its datum position, the square wave generator 30 providing the required pulses of current to effect its stepping. These pulses are interrupted by the contact 31 when the datum position is reached.

In order to prevent interference to the sound programme signals by the control signals an interlock means is provided in the form of a switch 52. This switch is a double pole throw switch, one pole of which is arranged in one condition to open the supply current path between the contacts 48, 50, and switch 51 and the phantom connection provided by the tapped primary winding of the transformer 39 whilst at the same time the other pole closes the sound signal path between the secondary winding of the transformer 39 and the signal conductor 34. In the other condition of the switch device said one pole is arranged to close the current path between the contacts 48, 50, and switch 51 and the tapping of the transformer 39 whilst at the same time said other pole of the switch opens said signal path between the secondary winding of the transformer 39 and the signal adaptor 34 and connects across the sound input line 38 thereof a low impedance formed by the resistor 53 for the purpose of muting the sound channel.

If desired the second pair of conductors 6 may be utilised, during such time as they are not in use for the conveyance of control signals, for the conveyance of auxiliary signals which may be of any nature having characteristics which are suitable for transmission over the pair 6. To this end coupling or switching means may be associated with the terminals 28, 29, at the exchange and 41, 42, at the subscriber's installation which are effective to isolate from the pair 6 the switching arrangements both at the programme exchange and at the subscribers installation so that they are prevented from interfering with the transmission of the auxiliary signals 62, 63. It is not necessary that these auxiliary signals be related in any way to those normally conveyed between the programme exchange and the subscriber in connection with broadcasting programmes. The auxiliary signals may, for example, be concerned with additional sound-only programmes, telephone signals, control signals in respect of pay-television programmes, telemetering signals in respect, for example, of gas, water or electricity consumption by the subscriber or signals related to the control of surveillance equipment for guarding or controlling access to the subscriber's premises.

Additionally in order to premit television signals to be conveyed in the reverse direction betwen the subscriber's installation 60 and the programme exchange over the pair 5 there may be provided a band splitting filter 61 associated with the terminals 22 and 32 by means of which signals passing over the pair 5 may be directed either as shown in the drawings or, when their frequency differs from that normally employed for the transmission of television signals from the programme exchange and the subscribers installation, between auxiliary pairs of terminals reserved for such reverse transmission of television programmes. At the subscribers installation these auxiliary terminals may serve for the connection of television signal generating means such, for example, as a television camera. The auxiliary terminals at the programme exchange may be connected to frequency translating means which are effective to translate the frequency band employed for the subscriber originated television signals to that employed for signals distributed from the programme exchange, these frequency translated signals then being applied to one of the signal highways 7 in the exchange from which they may be derived both by the originating subscriber and other subscribers connected to said exchange.

Further, although in the system described the television receiver 33 at the subscriber's installation has been assumed to be a specialised receiver inherently adapted to take advantage of the simplifications offered by a wired broadcasting system it may if desired be a receiver of the kind utilised for the aerial reception of television signals. In this case the signals on the line 35 are passed first to a signal adaptor, the output terminals of which are then connected to the normal aerial input socket of the aerial television receiver. Although it is possible to modify such a conventional aerial television receiver to utilise the audio frequency sound signals on the wired network it may be commercially expedient to avoid such modification. To this end sound signals may be provided both at audio frequency for use by simplified wired television receivers and in the form of an additional modulated high frequency carrier wave which has a frequency so related to that of the modulated high frequency carrier wave pertaining to the vision signals transmitted over the network that after passing through the signal adaptor it simulates the sound signal normally required for operation of the aerial television receiver.

What is claimed is:

1. A wired broadcasting system in which a program exchange is arranged to provide any one of a plurality of different program signals at a central location to each of a plurality of subscriber stations located remote from said program exchange, comprising in combination, a plurality of program selection means each connected with a corresponding subscriber station in said system, a cable connection between said program exchange and each of said subscriber stations which includes four conductors, a first pair of said conductors connected between said program exchange and each said subscriber station, means for supplying program signals and supply current for actuating said program selection means in one direction from said program exchange to said subscriber station on said first pair and a second pair of said conductors connected between said program exchange and each said subscriber station for conveying control signals to said program selection means in the opposite direction from said subscriber to said program exchange, and a control device at said subscriber station actuable by the subscriber for controlling the operation of said program selection means including means forming said control signals from said supply current.

2. A wired broadcasting system as claimed in claim 1 wherein the first pair of conductors allocated to the conveyance of program signals and supply current comprise a balanced transmission line for conveying said program signals, and including a phantom circuit connection for passing the supply current over said first pair of conductors.

3. A wired broadcasting system as claimed in claim 1 wherein the program selection means has a datum position and a plurality of program selection positions and the second pair conductors allocated to the conveyance of control signals are connected to first means to convey control signals, means is provided responsive to the control signals to move the program selection means from said datum position to another position at which signals pertaining to a desired program are applied to said first pair of conductors, and the second pair of conductors is connected to second means to convey ontrol signals to move said program seletion means to said datum position from another position.

4. A wired broadcasting system as claimed in claim 1 including a corresponding set of subscriber's exchange equipment at said central location connected by at least one pair of said conductors for response to said control device.

5. A wired broadcasting system as claimed in claim 4 wherein the central location comprises a plurality of signal highways and the subscriber's exchange comprises means connected for establishing a signal connection between a signal highway carrying a desired one of the program signals and the conductors between the program exchange and the subscriber.

6. A wired broadcasting system as claimed in claim 5 wherein the program selection means comprises an electromechanically openable switch device having a driving solenoid and a plurality of contact means for establishing signal connections between signal highways and the cable connection between the program exchange and the subscriber.

7. A wired broadcasting system as claimed in claim 5, including means in the signal highways located at said program exchange arranged for operation as low impedance unbalanced signal paths.

8. A wired broadcasting system as claimed in claim 7, wherein the cable connection between the program exchange and the subscriber is arranged for operation as a balanced pair and transformer means are interposed between said signal highways and said cable connection.

9. A wired broadcasting system as claimed in claim 8, wherein said transformer means are connected between the program selection means and the cable connection to comprise a low impedance unbalanced signal transmission device.

10. A wired broadcasting system as claimed in claim 1, wherein means are provided for conveying over said second pair of conductors during such time as they are not in use for the conveyance of control signals auxiliary signals having characteristics which are suitable for transmission over said second pair.

11. A wired broadcasting system as claimed in claim 10 wherein said auxiliary signals are unrelated to those signals conveyed between said program exchange and the subscriber over said first pair.

12. A wired broadcasting system as claimed in claim 1 which includes means whereby reverse signals may be conveyed over said first pair of conductors from the subscriber to the program exchange, said reverse signals occupying frequencies differing from those of the signals passing from the program exchange to the subscriber over said first pair of conductors.

13. A wired broadcasting system as claimed in claim 12 including means wherein a subscriber-originated television transmission is passed to a signal highway from which it may be derived both by the originating subscriber and other subscribers connected to said exchange.

14. A program exchange for a wired broadcasting system in which any one of a plurality of different programs are arranged to be available to each of a plurality of subscriber stations located remote from said exchange, comprising in combination, means serving to establish a plurality of signal highways each carrying signals pertaining to a different program, a plurality of program selection means each pertaining to a corresponding subscriber and arranged selectively to establish a connection between one of said subscriber stations and one of said highways, a pair of program terminals for each said subscriber connected by said selection means to derive selected program signals from one of said highways, a pair of control signal terminals for response to control signals, a control device actuable by said subscriber to generate control signals at said pair of control signal terminals, electrical connections between said control terminals and said program terminals for passage of program signals comprising a phantom circuit connection providing passage of direct current control potential from said program exchange to said subscriber.

15. A program exchange as claimed in claim 14 which is arranged to provide television programs, and means in each signal highway arranged to carry both the vision and sound signals pertaining to a television program.

16. A program exchange as claimed in claim 15, with means arranged to provide the sound signals at audio frequency and the vision signals in the form of a modulated high frequency carrier wave.

17. A program exchange as claimed in claim 16 with means arranged to provide the sound signals both at audio frequency and in the form of an additional modulated high frequency carrier wave.

18. A program exchange as claimed in claim 15 with carrier means establishing modulated high frequency sound carrier wave at a frequency which is related to the frequency of the modulated high frequency vision carrier wave to provide a conversion to the frequencies required by a receiver of a kind utilized for the aerial reception of television signals and conversion adapter means to convert said carrier waves to those required by said receiver.

19. A program exchange as claimed in claim 14 including means operating signal highways as low impedance unbalanced signal paths.

20. A program exchange as claimed in claim 19, wherein means processes signals at the pair of program terminals balanced with respect to each potential and transformer means are interposed between said signal highways and said program terminals.

21. A program exchange as claimed in claim 20, wherein said transformer means are connected between the program selection means and the program terminals, and said program selection means comprises a low impedance unbalanced signal transmission device.

22. A program exchange as claimed in claim 14 wherein means are provided for applying to and deriving from said pair of conductors during such time as they are not in use for the conveyance of control signals auxiliary signals having characteristics which are suitable for transmission over said second pair.

23. A program exchange as claimed in claim 22 wherein said means are connected to provide auxiliary signals unrelated to those signals conveyed between said program exchange and the subscriber over said first pair.

24. A program exchange as claimed in claim 14 which includes means for conveying reverse signals over said first pair of conductors from the subscriber to the program exchange, said reverse signals occupying frequencies differing from those of the signals passing from the program exchange to the subscriber over said first pair of conductors.

25. A program exchange as claimed in claim 24, wherein means are provided for applying a subscriber-originated television transmission to a signal highway from which it may be derived both by the originating subscribers and other subscribers connected to said exchange.

26. In a wired broadcasting system, a subscriber's installation which comprises a pair of program signal terminals, means for deriving therefrom audio frequency signals for sound and high frequency signals for television programs, a supply current source, means for establishing a phantom connection between said pair of program signal terminals thereby to provide therefrom supply current from said source, program selection means at the program exchange, means connecting the subscriber's installation to said program selection means, means actuating said program selection means through said connecting means by said supply current, a pair of control terminals and control means responsive at the subscriber location for selectively establishing an electrical connection between one of said control terminals and said phantom connection established between said pair of program signal terminals to provide control signals for selecting different programs.

27. A subscriber's installation as claimed in claim 26 wherein the control means comprises a dial mechanism, and actuation means to establish at least one connection between one of said control terminals and said phantom connection.

28. A subscriber's installation as claimed in claim 27 wherein further control means are provided to establish further a selective connection between the other of said control terminals and said phantom connection and means actuated by the subscriber for establishing said further connection.

29. A subscriber's installation as claimed in claim 26, wherein interlock means are provided to prevent the simultaneous reception of sound program signals and the transmission of control signals by the control means whereby interference to the sound program signals by the control signals is avoided.

30. A subscriber's installation as claimed in claim 29, wherein the interlock means comprises a switch device which serves in one condition to open the current path between the control means and the phantom connection and at the same time close the sound signal path between said pair of program signal terminal and a loudspeaker arranged for reproduction of the sound signals, and in another condition serves to close the current path between said control means and said phantom connection and at the same time opens the sound signal path between said pair of program signal terminals and said loudspeaker.

31. A subscriber's installation as claimed in claim 26 which includes means for applying television signals to said pair of program signal terminals for transmission to the program exchange.

32. A subscriber's installation as claimed in claim 26 including a first pair of program conductors and a second pair of control conductors wherein means are provided for deriving from and applying to said pair of control terminals during such time as they are not in use for the conveyance of control signals auxiliary signals having characteristics which are suitable for transmission over said second pair of control conductors.

33. A subscriber's installation as claimed in claim 32, wherein said letter means provides auxiliary signals unrelated to those signals conveyed between said program exchange and the subscriber over said first pair.

References Cited

UNITED STATES PATENTS

| | | | |
|---|---|---|---|
| 3,105,873 | 10/1963 | Winston et al. | 178—DIG. 13 |
| 3,278,677 | 10/1966 | Fannoy | 178—DIG. 13 |
| 3,230,302 | 1/1966 | Bruck et al. | 178—DIG. 13 |
| 3,244,809 | 4/1966 | Fuller et al. | 178—DIG. 13 |
| 3,368,031 | 2/1968 | Eisele | 325—308 X |

FOREIGN PATENTS

| | | | |
|---|---|---|---|
| 893,475 | 4/1962 | Great Britain | 325—31 |

BENEDICT V. SAFOUREK, Primary Examiner

U.S. Cl. X.R.

178—DIG. 13